Nov. 11, 1958         C. R. VINCENT         2,859,677
HITCH-MEANS FOR VEHICLE-DRAWN IMPLEMENTS
Filed Feb. 9, 1955         2 Sheets-Sheet 1
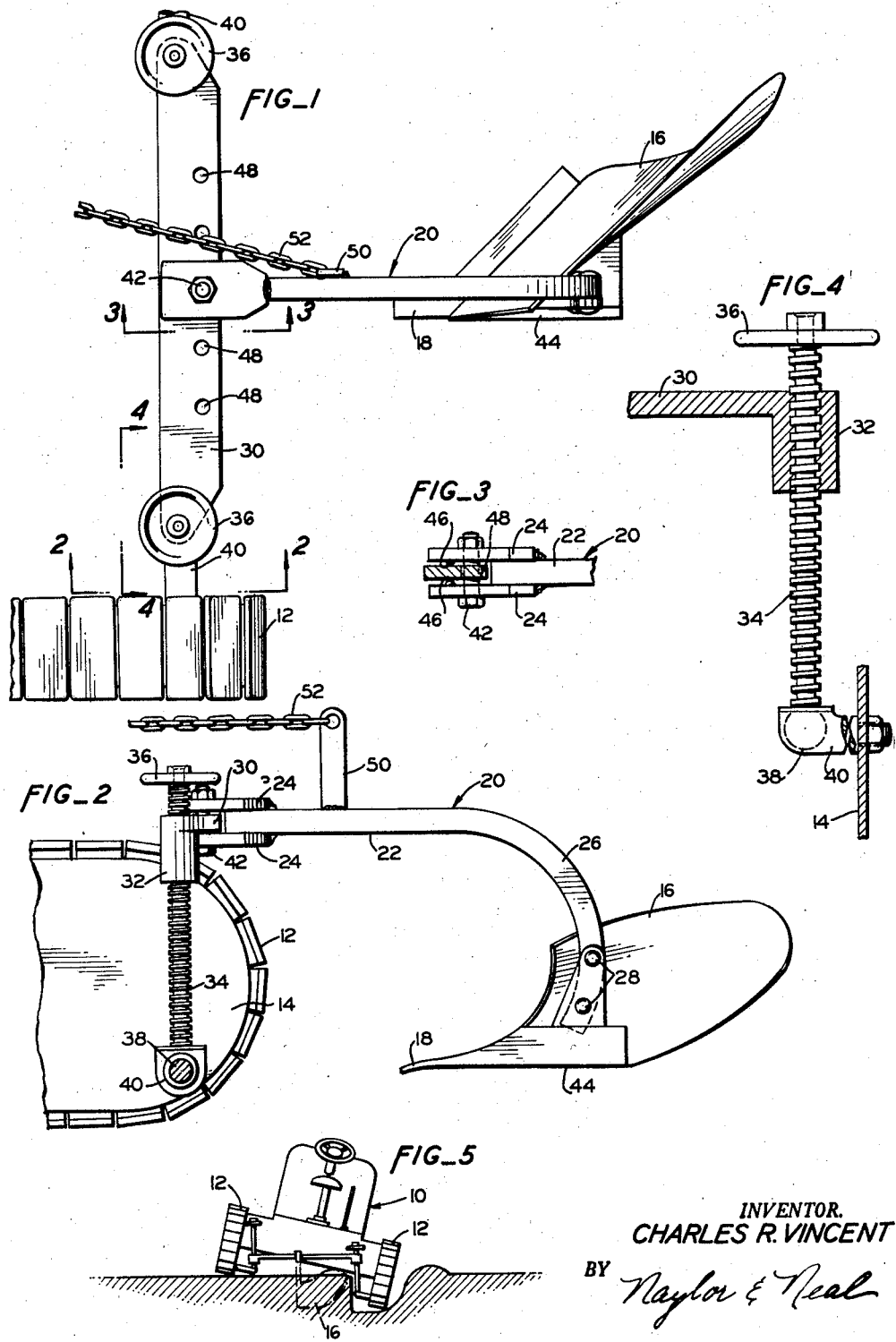
INVENTOR.
CHARLES R. VINCENT
BY Naylor & Neal
ATTORNEYS

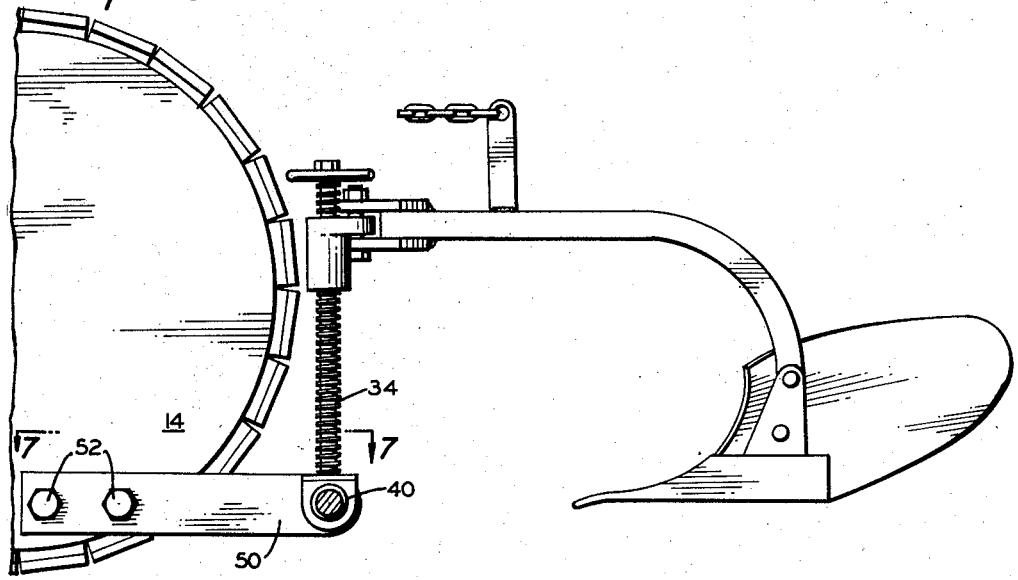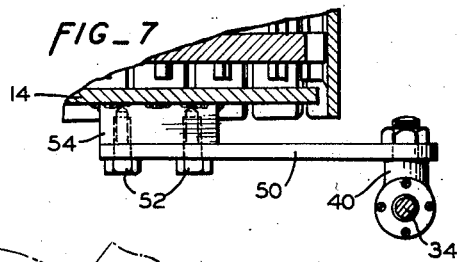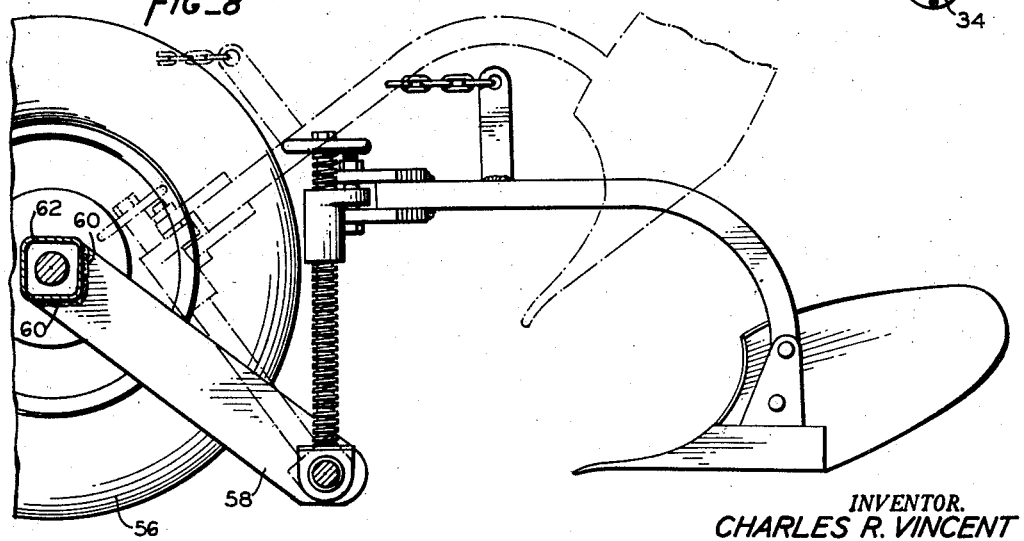

United States Patent Office 2,859,677
Patented Nov. 11, 1958

2,859,677

HITCH-MEANS FOR VEHICLE-DRAWN IMPLEMENTS

Charles R. Vincent, Salinas, Calif.

Application February 9, 1955, Serial No. 487,106

5 Claims. (Cl. 97—47.54)

This invention relates to hitching means for interconnecting a vehicle with equipment to be pulled thereby, and more particularly to a hitch arrangement for interconnecting a tractor with an agricultural implement, such as a plow.

In times past when land was tilled by hand, with plows being drawn by draft animals, the ropes or leather straps, constituting the hitching means between the harness of the draft animal and the plow, were so arranged as to have a relatively small included angle between them and the surface of the ground. Since the line of draft, so called, was almost parallel to the ground, it was a relatively simple matter for the operator to hand-control the plow as it planed through the ground. That is to say, since the line of draft was but slightly out of parallel relation with the ground surface, there was but a slight tendency for the plow to move upwardly out of the ground under the influence of the vertical component of force applied to the plow by the ground being plowed.

With the advent of tractors and mechanized plowing as it is generally practiced today, with hand-control of the operation of the plow being dispensed with, it became necessary to employ short coupled and substantially rigid hitching means, as distinguished from the relatively long ropes or leather straps which were employed in hand plowing. This change was accomplished by an increase in the angle of draft. In other words, the line of draft extending from the point of engagement of the plow in the ground to the point of connection of the plow on the tractor became more inclined upwardly with respect to the ground. This increased inclination of the line of draft thereby increased the tendency of the plow to be urged upwardly out of the ground, and various means, such as weights attached to the plow, have been employed to counteract this tendency and to keep the plow in the ground.

A comparatively recent development in connection with hitching means for mechanized plowing comprises the use of a parallelogram linkage to reverse the line of draft vector. Thus, the line of draft extended upwardly and rearwardly, thereby imparting a downwardly extending vertical component of force to the plow, rather than upwardly and forwardly.

It is thus seen that the conventional hitching means for tractor-drawn plows have the tendency of either pulling the plow out of the ground or into the ground, but in any case not in substantially a straight line, or parallel to the ground.

It is the essential purpose and object of this invention to provide a hitch for tractor-drawn plows, and the like, whereby the line of draft is substantially parallel to the ground surface.

A further object of the invention is to provide such hitching means whereby the attitude of the plow in the ground may be self-adjusting in response to the soil pressures applied to the plow to stabilize the flow, or movement, of the plow through the ground.

Other objects and advantages of the invention will be apparent from the following description taken in conjunction with the drawings forming part of this specification, and in which:

Figure 1 is a top plan view of the hitching means of the invention;

Figure 2 is a view in side elevation taken along lines 2—2 of Figure 1;

Figure 3 is a detail view in section taken along lines 3—3 of Figure 1;

Figure 4 is an enlarged detail view, partially in section, taken in the direction of lines 4—4;

Figure 5 is a rear view of a tractor-drawn plow embodying the subject hitching means, illustrating a particular operational attitude of the hitching means in relation to that of the tractor;

Figure 6 is a view similar to that of Figure 2, but showing a modification of the attachment between the hitching means and the tractor;

Figure 7 is a detail view taken along lines 7—7 of Figure 6; and

Figure 8 is a view in side elevation showing the hitching means in attached relation with a wheel type tractor.

With reference to the drawings, the tractor 10, having continuous tracks 12 disposed in embracing relation with track support plates 14, has attached thereto a plow 16 having a leading edge, or point 18. The means connecting the plow 16 to the tractor 10, constituting an embodiment of the hitching means of the invention, comprise: an arm indicated generally at 20 having a straight forward portion 22, secured as by welding to spaced adapter plates 24, and having a downwardly and rearwardly curved portion 26, secured as by bolts 28 to plow 16; a draft bar 30 having downwardly extending end hubs 32 in threaded engagement with jackscrew spindles 34, said spindles having control wheels 36 fixedly secured to the upper ends thereof and having ball-shaped lower ends 38; a pair of oppositely disposed socket members 40 mounted on plates 14 and having disposed therein the ball ends 38 of spindles 34; and bolt means 42 mutually securing the adapter plates 24 to drawbar 30.

It will be appreciated, with reference to Figure 2, that the subject hitching means is substantially in the form of an inverted U, whereby the leading edge 18 of the plow may be operatively disposed very close to the level of the points of attachment of the plow to the tractor, namely, the ball and socket connections 38—40. The height above the ground level of the inverted U may be decreased to increase the depth of plowing, as by adjustably rotating the spindles 34 in one direction, or the height above ground level of the inverted U may be increased to decrease the depth of plowing, as by reversely rotatively adjusting the spindles 34. When the plow is working in the ground, the line of draft extends from plow point 18 to the ball joints 38—40, with said line of draft forming a small acute angle with the horizontal. The spindles 34 pivotally orient themselves so that they are disposed at a right angle to the line of draft. By virtue of the universal mounting, 38—40, of the hitching means on the tractor, the plow base 44 can swing in an arc about the points of attachment of the tractor, and thus the point 18 of the plow base 44 will tend toward neither up nor down movement, but will, in effect, flow through the soil with the balancing pressures of the soil maintaining it in a constant positional attitude.

In Figure 5, which shows one track of the tractor traveling in an earlier plowed furrow, the drawbar 30 is shown as having been adjusted on the two spindles 34 to a position in which it is parallel to the ground surface. It will be appreciated that the right hand point of attachment, 38—40, between the plow and the tractor in Figure 5 is disposed below the level of the ground.

As shown in Figure 3, the subject hitch embodies means enabling a slight upward or downward movement of the arm 20 in relation to the drawbar 30, said means comprising a pair of substantially semi-spherical dimples 46 extending from adapter plates 24 into engagement with the drawbar 30, and an oversize aperture 48 in said drawbar for the reception of the bolt 42. This pivotal free play arrangement is provided to absorb any shock occurring when the plow base hits a buried object, such as a rock or stump.

The drawbar 30 is provided with a plurality of spaced apertures 48 so that a plurality of plows may be drawn by the tractor.

In order that the plow may be carried in an inoperative position by the tractor during periods of non-use, arm 20 of the hitching means is provided with an upstanding stub arm 50 having secured thereto a chain 52 which in turn is connected with a takeup means, not shown, disposed on the tractor. When the plow is in use, the chain 52 is in a slack condition.

It will be appreciated that means other than the jackscrew spindles 34 may be employed to effect an increase or a decrease of the height of the inverted U with respect to ground level. For example, hydraulic cylinders, having a ball and socket connection with the tractor and being remotely operable from the driver's seat of the tractor, could be employed.

Figures 6–8 illustrate alternate modes of attachment of the hitching means to both track and wheel type tractors. The embodiment shown in Figure 6 differs from that of Figure 2 in that the spindles 34 and the socket members 40 therefor are carried by a pair of arms 50 fixedly secured to plates 14, as by bolts 52 in threaded engagement with blocks 54 welded to said plates 14. This disposition of the hitch assembly farther to the rear of the tractor provides additional lateral clearance for the working of the hitch assembly.

In Figure 8, the hitch assembly is secured to a tractor having wheels 56 by means of a pair of arms 58 which may be rigidly attached, as by welds 60, to the axle housing 62. The arms 58 enable the disposition of the hitch assembly sufficiently rearwardly of the tractor to provide for full lateral clearance.

While a specific embodiment of the hitching means of the invention has been shown and described, it is to be understood that all substantial equivalents thereof are considered to be within the spirit and scope of the invention.

What is claimed is:

1. A hitch for connecting a plow to a tractor comprising a pair of normally vertically and oppositely disposed spindle members terminating in downwardly directed ball-shaped lower end portions, upward disposed socket means adapted to be carried by a tractor for pivotally attaching the lower end portions of said members to a tractor closely adjacent ground level, a normally horizontally extending drawbar having the ends thereof adjustably secured to said spindle members for upward and downward movement thereon, an arm member connected to said bar in trailing relation therewith, said arm member having a relatively straight forward portion and a downwardly extending rearward portion adapted to be secured to a plow, said spindle members, drawbar and arm member being operatively disposed for free swinging movement with respect to said ball and socket means.

2. A hitch, as set forth in claim 1, embodying means independently adjustably securing the ends of said drawbar to said spindles; and means pivotally securing the forward portion of said arm member to said bar for pivotal movement with respect thereto about a vertical axis.

3. A hitch, as set forth in claim 2, further embodying means enabling slight vertical swinging movement of said arm member with respect to said bar.

4. A hitch for connecting a plow to a tractor, said hitch being, in side elevation, substantially in the form of an inverted U having forward and rearward legs and a normally substantially horizontally disposed intermediate portion interconnecting said forward and rearward legs, means for attaching the lower end of said rearward leg to a plow, means for attaching the lower end of said forward leg to a tractor, said latter means being disposed on said tractor closely adjacent to ground level and constituting a pivotal connection enabling swinging movement of said hitch with respect to a horizontal axis extending transversely to the direction of movement of said tractor, whereby a plow attached to said rearward leg may bodily swing about said pivotal connection to become oriented during operation solely in response to the working pressures applied thereagainst by the earth being plowed, and means for vertically adjusting the point of connection between said forward leg and said intermediate portion of said hitch while enabling the maintaining of the normally substantially horizontally disposed attitude of said intermediate portion, whereby the working depth of said plow may be controlled without materially varying the angle of draft thereof.

5. A hitch as set forth in claim 4, said means for attaching said forward leg to said tractor comprising a ball and socket connection.

References Cited in the file of this patent

UNITED STATES PATENTS

| | | |
|---|---|---|
| 1,450,417 | Gingerick | Apr. 3, 1923 |
| 1,529,425 | Ferguson | Mar. 10, 1925 |
| 1,607,452 | Galick et al. | Nov. 16, 1926 |
| 1,864,639 | Crezee | June 28, 1932 |
| 2,190,347 | Austin | Feb. 13, 1940 |
| 2,341,807 | Olmstead | Feb. 15, 1944 |
| 2,477,994 | Love | Aug. 2, 1949 |
| 2,585,085 | Brown | Feb. 12, 1952 |
| 2,625,754 | Morgan | Jan. 20, 1953 |
| 2,698,564 | Sawyer | Jan. 4, 1955 |
| 2,713,296 | Silver et al. | July 19, 1955 |

FOREIGN PATENTS

| | | |
|---|---|---|
| 691,168 | France | July 7, 1930 |
| 505,837 | Belgium | Sept. 29, 1951 |